May 15, 1945.  T. IAVELLI ET AL  2,375,790
POWER TRANSMISSION
Filed Sept. 5, 1942  2 Sheets-Sheet 1
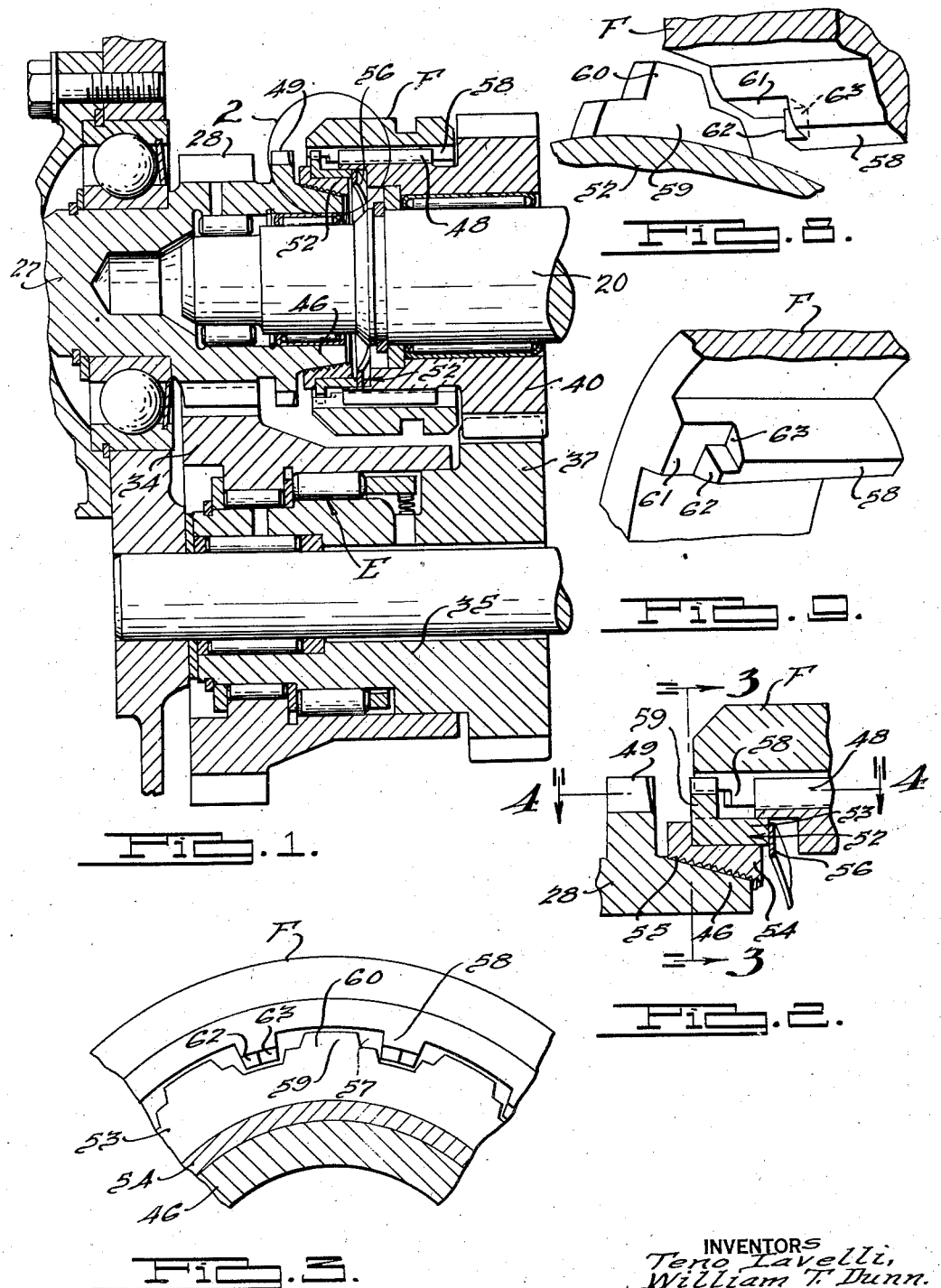
INVENTORS
Teno Iavelli,
William T. Dunn.
BY
Harness, Dickey, Patee & Hennie
ATTORNEYS.

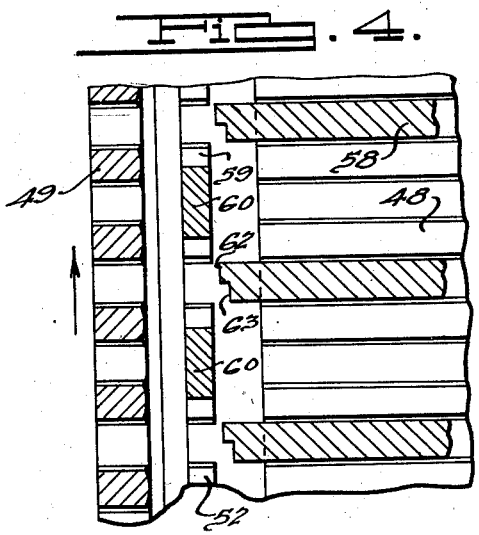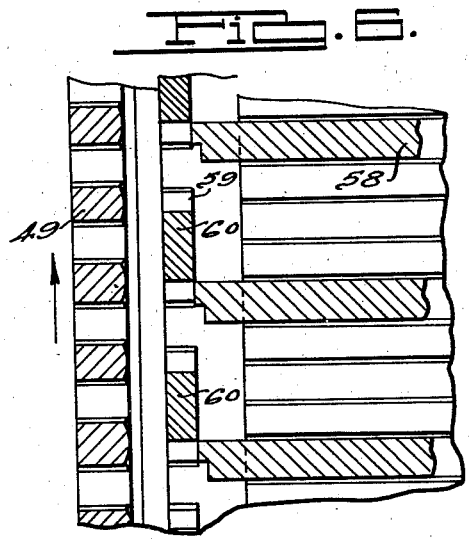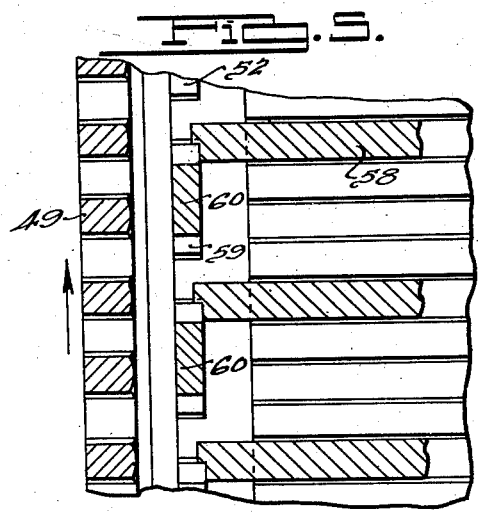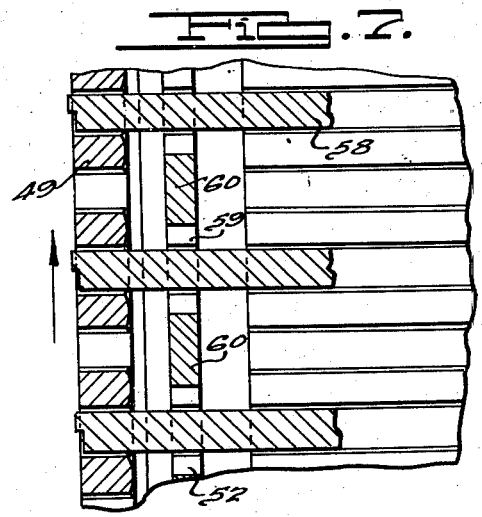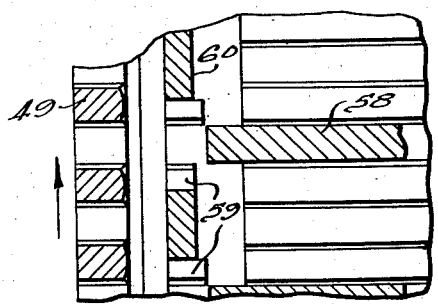

Patented May 15, 1945

2,375,790

UNITED STATES PATENT OFFICE 2,375,790

POWER TRANSMISSION

Teno Iavelli and William T. Dunn, Detroit, Mich., assignors to Chrysler Corporation, Highland Park, Mich., a corporation of Delaware Application September 5, 1942, Serial No. 457,438

14 Claims. (Cl. 192—53)

This invention relates to motor vehicles and refers more particularly to power transmission and control mechanism therefor.

Our invention has particular reference to transmission systems in which the torque load is relieved as by momentary interruption of the drive of the engine in order to facilitate engagement of change-speed elements. One example of such a transmission is described and claimed in the co-pending application of Carl A. Neracher et al., Serial No. 335,310, filed May 15, 1940.

In transmissions of this type a change-speed element, usually a clutch sleeve, is operably connected to a power unit such that shifting tendency of the element is automatically controlled by car speed under certain conditions and by manual control under certain other conditions. In both instances, however, actual shift of the element to engage a higher ratio does not take place until the torque of the engine has been relieved by release of the throttle control.

A blocker member is practically always provided in these types of transmissions to prevent engagement of the clutch sleeve until the driving and driven portions of the transmission have become synchronized. The ordinary blocker member which is widely used in the art consists of a toothed ring, the teeth having the same pitch and arrangement of either the driving or the driven member, which is interposed between the driving and driven members in such manner that the blocker teeth engage the sleeve teeth when the blocker is in blocking position. The blocker is adapted to "clock" between a blocking position and a non-blocking position and when the blocker has been rotated to non-blocking position by means of friction engagement with the driving or driven member, the sleeve teeth are permitted to slide through the blocker teeth and the shift in ratio is made.

When such blockers are used with transmissions of the type under discussion which employ power means for storing energy in a spring, the spring acting to urge the sleeve toward engaged position, difficulty has been experienced due to the fact that the transmission governor frequently calls for an upshift when the car is coasting and the sleeve is blocked against shift in a "coast block" position. When this occurs, the sleeve will be thrust forwardly upon rotation of the blocker when the driver accelerates the engine and will engage while the engine is driving the vehicle instead of while the vehicle is coasting. Engagement of the sleeve under such circumstances is usually accompanied by noise and breakage is liable to occur. This condition will be more fully explained in connection with the following description.

Accordingly, it is the main object of this invention to provide an improved blocker mechanism which will absolutely prevent the clutch sleeve from engaging "on drive"; it being necessary in our improved structure to reverse the engine torque and "coast" before the engagement can take place.

Another object is to provide a simple and effective means for guarding against the possibility of breakage of parts in the transmission mechanism due to improper sleeve engagement.

Further objects and advantages of our invention will be more apparent from the following illustrative embodiment thereof, reference being had to the accompanying drawings in which:

Fig. 1 is a sectional side elevational view showing a portion of the motor vehicle power transmission.

Fig. 2 is an enlarged fragmentary sectional elevational view through the power operated clutching mechanism as indicated by the circle "2" in Fig. 1.

Fig. 3 is a detail enlarged view of the blocker clutch and sleeve as seen in Fig. 2 looking in the direction of the arrows 3—3.

Fig. 4 is a sectional plan view illustrated as a development according to line 4—4 of Fig. 2, the automatic clutching sleeve being released.

Fig. 5 is a similar view showing the automatic clutching sleeve in its intermediate shift position during the drive blocking condition.

Fig. 6 is a similar view showing the automatic clutching sleeve in its coast blocking condition.

Fig. 7 is a similar view showing the automatic clutching sleeve in full clutching engagement.

Fig. 8 is a fragmentary perspective of the sleeve and blocker in neutral position.

Fig. 9 is a fragmentary perspective of the sleeve showing the tooth form.

Fig. 10 is a developed view of the teeth of a modified form of blocker.

Referring to the transmission, which has an input shaft 27 and an output shaft 20, pinion 28 is in constant mesh with gear 34 which drives countershaft 35 through an overrunning clutch E of the usual type such that when the input shaft 27 drives in counterclockwise direction (looking from front to rear and as indicated by the arrow in Figs. 3, 4, 5, 6, 7, and 10 respectively) then clutch E will engage to lock gear 34 to countershaft 35 whenever the gear 34 tends to drive faster than the countershaft. However, whenever this gear 34 tends to rotate slower than the countershaft then clutch E will automatically release whereby shaft 27, under certain conditions, may readily drop its speed while countershaft 35 continues to revolve.

Countershaft 35 comprises the usual cluster gears which respectively provide drives in first, third and reverse. The gear 37 which forms part of the countershaft cluster meshes with a gear 40 which is adapted to be clutched to the output shaft 20 by manual or other means (not shown).

Slidably splined on teeth 48 carried by gear 40 is the automatic clutching sleeve F which, under certain conditions, is adapted to shift forwardly to clutch with teeth 49 carried by pinion 28 thereby positively clutching shaft 27 directly to gear 40. This sleeve F is adapted to step-up the speed ratio drive from first to second and from third to fourth which is a direct drive speed ratio. Control means is provided which limits clutching of sleeve F to approximate synchronism with teeth 49 and also to a condition of engine coast, sleeve F being prevented from clutching during that condition known as engine drive as when the engine is being speeded up under power.

When driving in underdrive, direct is obtained by the driver releasing the usual accelerator pedal (not shown) thereby allowing the engine throttle valve to close and cause the engine to rapidly coast down. When this occurs, the engine along with shaft 27, pinion 28 and gear 34 all slow down while shaft 20 along with gears 40 and 37 continue their speeds by accommodation of clutch E which overruns. The engine slows down until teeth 49 are brought to approximate synchronism with sleeve F which thereupon automatically shifts to clutch with teeth 49 resulting in a two-way drive for direct as follows: pinion 28 through sleeve F to gear 40 thence to shaft 20, the clutch E overrunning.

Referring particularly now to Figs. 2-7 inclusive, it will be seen that the gear 28 is provided with a conical hub portion 46 on which the blocker ring 52 is carried. The latter preferably consists of a stamping 53 to which is attached a bronze friction ring 54. The ring 54 carries a set of threads 55 which engage the smooth conical surface of the portion 46 under the light pressure of a spring 56. The blocker ring 52 will thus tend to rotate in the direction of the shaft 27 because of the frictional driving connection at the threads 55.

The stamped portion 53 of the blocker is provided with grooves 57 which are adapted to slidably receive the internal teeth 58 of the sleeve F. As is apparent from Fig. 4, there are only one-half as many teeth 58 as there are teeth 48 and 49, every other one of the teeth on the sleeve F being omitted.

Alternately arranged with the grooves 57 on the ring portion 53 are teeth 59. The teeth 59 have a radial extension 60 which is narrower than the main body of the teeth as illustrated and which as seen in Fig. 4 are substantially twice the width of the grooves between the teeth 48. A portion of the sleeve teeth 58 are cut back at their forward ends forming truncated tooth portions as indicated by numeral 61, such that when the sleeve is in its Fig. 2 neutral position the forward ends of the teeth 58 (the truncated portions) engage between the teeth 59 of the blocker ring 52 and the latter is free to rotate relatively to the sleeve with the limit defined by the extension 60. In other words, the blocker ring 52 can rotate from a "leading" position wherein one side of the tooth extension 60 engages the adjacent side of the tooth 58 to a "lagging" position wherein the opposite side of the extension 60 engages the adjacent side of the next tooth 58. The blocker ring 52 "clocks" between these two positions in accordance with the relative speeds of the pinion 28 and the sleeve F.

When the pinion 28 is rotating faster than the sleeve in counterclockwise direction (in underdrive condition) the blocker ring 52 will lag the hub 46 and when the sleeve is rotating faster than the pinion, as when coasting in underdrive the blocker ring will lead the hub 46. In the first case, the hub 46 tends to drive the blocker which is held back by the trailing face portions of the sleeve teeth 58 while in the second case the leading face portions of the sleeve teeth drag the blocker around on the hub.

The main body portions of the sleeve teeth 58 at the clutching end thereof are also provided with a step just rearwardly of the truncated portions 61, forming in effect connected tooth portions or teeth one of which 62 extends axially in the direction of the blocker ring 52 beyond the other portion 63 to provide offset blocker engaging faces. These tooth portions, as will readily be understood from Fig. 9, may for convenience of reference be said to be relatively long or relatively short, that is to say, of different axial lengths although obviously the rear ends of these tooth portions in the disclosed embodiment have nothing to do with the clutching action. One or the other of these tooth portions 62 and 63 is adapted to engage the blocker tooth 59 upon forward shift of the sleeve in accordance with the blocker position. If the blocker is in drive block (lagging) position, the short tooth portion 63 will engage the reaward face of the tooth 59 at one circumferential side portion thereof and if the blocker is in coast block (leading) position, the long tooth portion 62 will engage the opposite circumferential side portion of a similar face of the next adjacent tooth 59.

Fig. 5 shows the parts in drive block position while Fig. 6 illustrates the coast block position.

The operation of the device is as follows:

Let it be assumed that the transmission mechanism herein described is embodied in a motor vehicle having an engine adapted to drive the pinion 28 in a counterclockwise direction as viewed from the left of Fig. 1; and let it be further assumed that the sleeve F is connected to suitable servo-motor mechanism which is adapted to shift the sleeve F toward the left of Fig. 1 to engage the clutch teeth 49 in response to suitable control instruments on the vehicle. While the herein described mechanism is particularly suitable for transmissions embodying some type of automatic or semi-automatic power shifting, it is desired to point out that the mechanism may be used in transmissions where the sleeve F is shifted manually.

The position of the sleeve teeth 58 during driving through the transmission with the sleeve F in its disengaged position is shown in Fig. 4. In other words, Fig. 4 illustrates diagrammatically the relationship of the sleeve teeth 58, the blocker teeth and the clutch teeth 49 before axial thrust has been imparted to the sleeve F tending to shift it to the left of Fig. 1 to engage the clutch teeth 49.

With the shaft 27 rotating counterclockwise, the blocker ring 52 will be rotated in a counterclockwise direction because of the frictional driving relationship of the cone-shaped clutch portion 46 but because of the engagement of the portions 60 of the blocker teeth with the axially forwardly extended portions 61 of the sleeve teeth, the blocker ring is able to rotate counterclockwise with respect to the sleeve F only sufficiently to take up the clearance between the extended portions 60 and the portions 61. Reference to Fig. 3, which shows the relationships between the sleeve teeth and the blocker teeth, will facilitate understanding of this.

Under ordinary conditions the transmission will be functioning under these circumstances to provide a relatively low speed drive through the cluster gears 34, 37, etc., and the pinion 28 will, therefore, be rotating in a counterclockwise direction faster than the sleeve F. Thus the blocker teeth will be urged forwardly and will have a leading relationship with respect to the sleeve teeth.

Movement of the sleeve F toward the left of Fig. 1 either by manual operation or by the operation of a servo-motor will advance the sleeve from the Fig. 4 position to the Fig. 5 position where the shorter portions 63 of the teeth 58 will abut one side of the blocker teeth 59 thus preventing further movement of the sleeve. This is known as the "drive block" position of the sleeve and the sleeve will be blocked in this manner so long as drive continues through the transmission.

Release of the drive through the transmission by disengagement of the vehicle clutch or by release of the accelerator pedal will result in a falling off of speed of the shaft 27 with respect to the shaft 20 (the latter is intended to be connected to the driving wheels of the vehicle) and when the speed of the shaft 27 has fallen to the speed of the shaft 20 and has dropped slightly below the speed of the shaft 20, the blocker ring 52 will, relatively speaking, be moved clockwise with respect to the sleeve F whereupon the short portions 63 of the teeth 58 will be unblocked and will pass through the blocker teeth and engage the clutch teeth 49 as illustrated in Fig. 7. Fig. 7 illustrates the high speed or engaged position of the sleeve, which position is normal for most driving.

Under such conditions that the sleeve F tends to be shifted to high speed position when the vehicle is coasting, the blocker will function to prevent clashing of the teeth as illustrated in Fig. 6. If the vehicle is coasting, the shaft 20 will usually be rotating faster than the shaft 27 and the blocker ring will then have a lagging relationship with respect to the sleeve teeth instead of a leading one. This may be readily understood by referring to Fig. 3 where it will be seen that reversal of the driving thrust on the blocker ring at the hub 46 will result in the sleeve moving through the clearance between the radial extensions 60 and the space between the axial extensions 61 of the sleeve teeth.

When the blocker ring is in the aforesaid lagging position, forward movement of the sleeve will result in the longer portions 62 of the sleeve teeth 58 engaging the side of the blocker teeth 59 as illustrated in Fig. 6. This position of the blocker is known as the "coast block" position.

If the engine of the vehicle should be accelerated while the blocker is in the coast block position, the shaft 27 will rapidly increase in speed to a speed higher than that of the shaft 20. At the instant of synchronization of the shafts 27 and 20 the blocker ring 52 will be moved to an unblocking position permitting the long tooth portions 62 of the teeth 58 to slip by the teeth 59 of the blocker ring. However, before the sleeve can be shifted through into engagement with the clutch teeth 49, the blocker ring, due to increase in speed of shaft 27, will have moved to a new blocking position that with the short portions 63 of the sleeve teeth 58 engaging teeth 59. In other words, acceleration of the shaft 27 will cause the blocker to rotate from coast block position to drive block position as the shaft 27 increases in speed over the shaft 20. Movement of the blocker ring between these two positions under these circumstances will leave the sleeve F unblocked for an instant and permit it to move forwardly. However, due to the long and short portions of the sleeve teeth 58 the blocker ring normally moves from lagging to leading position faster than the sleeve F moves toward the clutch teeth 49, the result being that the shorter portions of the sleeve teeth 58 engage the sides of the blocker teeth 59 with the result that the sleeve now becomes blocked in drive block position.

It can thus be seen that the long and short portions of the sleeve teeth 58 act to positively prevent engagement of the sleeve "on drive." It has been found undesirable to permit the sleeve to engage the clutch teeth 49 except during coasting of the vehicle. Engagement of the sleeve while the shaft 27 is being accelerated frequently causes breakage of the teeth and is accompanied by noise and shock.

Operation of the modification illustrated in Fig. 10 is similar to that described above in all respects. In Fig. 10 the blocker ring 52 is in a leading position when the shaft 27 is rotating faster than the shaft 20 and the shorter portions of the blocker teeth are adapted to abut the sleeve teeth upon shifting movement of the sleeve. When the blocker ring is in lagging position, the longer portions of the blocker teeth are adapted to be engaged by the sleeve teeth on shifting movement of the sleeve and acceleration of the shaft 27 while the sleeve F is in its coast block position will result in rapid reversal of the position of the blocker such that the shorter portions of the blocker teeth will catch the sleeve teeth and prevent engagement on drive in a manner identical with that described above. It is to be observed that here again the terms "long" and "short" are employed for convenience of reference although the forward ends of the blocker teeth in the Fig. 10 embodiment have nothing to do with the blocking action. Accordingly, it will be understood that reference herein and in the claims to long or short teeth or tooth portions or teeth of different axial length has reference to the extent of projection of one of these teeth or tooth portions over the other in an axial direction between the sleeve and the blocker ring and not necessarily to the actual relative axial length of these teeth or tooth portions which may be relatively varied as desired.

It will thus be seen that we have provided a novel arrangement of blocker mechanism which acts to prevent engagement of the sleeve teeth with the clutch teeth of the driving member except under conditions of synchronous rotation of the driving and driven shafts during coasting of the vehicle.

We claim:

1. In a motor vehicle drive, co-acting relatively rotatable coaxial power transmitting members one having clutch teeth positively driven therewith; two sets of teeth driven from the other of said members and rotatably connected together with the tooth portions thereof so constructed as to provide clearance to accommodate their limited relative rotation between predetermined positions of relatively blocking relationship; one of said sets of teeth being shiftable relatively to the other to engage said clutch teeth under blocking control of the other of said sets of teeth; means comprising a connection between one of said members and one of said sets of teeth operable to relatively rotate said sets of teeth between said positions of blocking relationship when one of said members tends to exceed or drop below the speed of the other; one of said sets of teeth having axially offset end portions selectively engaged with end portions of the other of the sets of teeth when said sets of teeth are relatively rotated in said positions of blocking relationship, said offset portions being so spaced in an axial direction from the other set of teeth as to unblock the shiftable teeth when one of the members coasts down to approximately the speed of the other while maintaining the shiftable teeth blocked when this said one member speeds up to and above the speed of the other member.

2. In a motor vehicle in combination, a set of clutch teeth; an axially shiftable sleeve having teeth adapted to mesh with said clutch teeth; a set of blocker teeth disposed between said clutch teeth and said sleeve teeth and normally in mesh with the latter, said blocker and sleeve teeth being so constructed as to provide for limited rotation of said blocker teeth between blocking and unblocking positions relatively to said sleeve teeth; a driving connection between said blocker teeth and said clutch teeth for rotating said blocker teeth relatively to said sleeve teeth; said sleeve teeth having offset portions spaced axially at different distances from the portions thereof normally in mesh with said blocker teeth such that shifting of the sleeve when the clutch teeth are rotating faster than the sleeve will engage the more remote of said offset portions with the blocker teeth, and shifting of the sleeve when the sleeve is rotating faster than the clutch teeth will engage the nearest of said offset portions with the blocker teeth.

3. In a motor vehicle transmission in combination, a driving member having clutch teeth thereon; an axially shiftable driven sleeve having teeth thereon adapted to mesh with the clutch teeth to provide a drive through the transmission; a blocker member disposed between the driving member and sleeve and having teeth normally in mesh with teeth on said sleeve, said meshing teeth being so shaped as to provide for limited rotation of said blocker member relative to said sleeve; a driving connection between the driving member and blocker member operable to rotate the blocker member through said limited rotation in either direction of rotation depending on whether the driving member is rotatively leading or lagging the sleeve; said teeth on said blocker member disposed such that they are in abutting relation with said sleeve teeth when the blocker is in either of its extreme rotative positions; the sleeve teeth having offset portions spaced axially at different distances from the portions thereof normally in mesh with said blocker teeth such that drive-establishing shift of the sleeve when the sleeve is lagging the driving member will axially engage the offset portions of the sleeve teeth remote from the blocker teeth therewith and drive-establishing shift of the sleeve when the sleeve is leading the blocker will axially engage the offset portions of the sleeve teeth nearest the blocker teeth therewith.

4. In a motor vehicle drive, co-acting relatively rotatable coaxial power transmitting structures one having clutch teeth positively driven therewith; two sets of teeth driven from the other of said structures and rotatably connected together through said teeth with clearance between said teeth to accommodate their limited relative rotation between predetermined positions of relatively blocking relationship; one of said sets of teeth being shiftable relatively to the other to engage said clutch teeth under blocking control of the other of said sets of teeth; means comprising a connection between one of said structures and one of said sets of teeth operable to relatively rotate said sets of teeth between said positions of blocking relationship when one of said structures tends to exceed or drop below the speed of the other; certain teeth of one of said sets having axially offset face portions, said portions of each said teeth being selectively engageable with an axial face portion of a tooth of the other of said sets of teeth when said sets of teeth are relatively rotated in said positions of blocking relationship; the said offset face portions being so spaced with respect to the teeth of the other set such that the shiftable teeth are unblocked when one of the structures coasts down to synchronism with the other while maintaining the shiftable teeth blocked when this said one structure speeds up to and above the speed of the said other structure.

5. In a power transmission, in combination, a shiftable clutch sleeve having drive transmitting teeth; a blocker disposed adjacent said sleeve and provided with blocker teeth, said teeth having portions of different width; said sleeve teeth having portions extending axially beyond the main body thereof for engaging the narrower portions of the blocker teeth thereby to limit rotation of the blocker relative to the sleeve, and the main body of the sleeve teeth being provided with adjacent portions of different axial length for selectively abutting said blocker teeth in accordance with the lagging or leading relation of the blocker with the sleeve as permitted by the aforesaid limited rotation.

6. In a power transmission, in combination, a shiftable clutch sleeve having drive transmitting teeth; a blocker disposed adjacent said sleeve and provided with blocker teeth, said blocker teeth each having a radial extension of less width than the main body thereof; said sleeve teeth each having a relatively shallow portion extending axially beyond the main body thereof for engaging between adjacent radial extensions of the blocker teeth thereby to limit rotation of the blocker relative to the sleeve, the main body of each of said sleeve teeth having adjacent portions of different axial length for selectively abutting said blocker teeth in accordance with the lagging or leading relation of the blocker with the sleeve as permitted by the aforesaid limited rotation.

7. In a power transmission, in combination, a shiftable clutch sleeve having drive transmitting teeth; a blocker disposed adjacent said sleeve and provided with blocker teeth, said blocker teeth each having a radial extension of less width than the main body thereof; said sleeve teeth each having a relatively shallow portion extending axially beyond the main body thereof for engaging between adjacent radial extensions of the blocker teeth thereby to limit rotation of the blocker relative to the sleeve, the main body of each of said sleeve teeth having adjacent portions of different axial length for selectively abutting said blocker teeth in accordance with the lagging or leading relation of the blocker with the sleeve as permitted by the aforesaid limited rotation, the portions of greater length abutting when the blocker is lagging the sleeve and the portions of lesser length abutting when the blocker is leading the sleeve.

8. In a power transmission, in combination, a shiftable clutch sleeve having drive transmitting teeth; a blocker disposed adjacent said sleeve and provided with blocker teeth, said blocker teeth each having a radial extension of less width than the main body thereof, and an axial extension adjacent a lateral face of said teeth also of less width than the main body thereof; said sleeve teeth each having a relatively shallow portion extending axially beyond the main body thereof for engaging between adjacent radial extensions of the blocker teeth thereby to limit rotation of the blocker relative to the sleeve, the parts being constructed and arranged such that the main body of each sleeve tooth is adapted to abut the said lateral face or axial extension of a blocker tooth depending upon the lagging or leading relation of the sleeve with respect to the blocker.

9. In a clutch mechanism, in combination with a pair of torque transmitting members to be drivingly connected, each having radially outwardly extending teeth, a jaw clutch sleeve having internal teeth meshing with the teeth of one of said members and axially slidable into clutching engagement with the teeth of the other member, said sleeve teeth having base portions at least one of which extends axially beyond the tip portion thereof to define a corner recess, and said tip portion having axially offset end portions adjacent said recess; and a blocker ring having a radially outwardly extending lug received between the base portions of adjacent sleeve teeth to provide for limited oscillating movement of said ring relative to said sleeve, said blocker ring also having a radially outwardly extending blocker element to be received in said recess and to be selectively disposed in blocking relation to said offset end portions of said tooth tip upon shift of said sleeve and in accordance with the lagging or leading relation of the blocker element relative to the sleeve as permitted by said oscillating movement.

10. In a clutch mechanism, in combination with a pair of torque transmitting members to be drivingly connected, one having radially outwardly extending jaw clutch teeth and having a friction clutch element disposed radially inwardly of said teeth and the other carrying a splined sleeve the teeth of which are of substantially the same pitch diameter as said jaw clutch teeth, the said clutch teeth and sleeve being relatively shiftable axially into clutching engagement, a tooth on said sleeve having end portions axially and circumferentially offset with respect to each other, a blocker ring including a friction clutch portion for engagement with said friction clutch element, and including an outwardly extending flange, a lug carried by said flange and extending between adjacent sleeve teeth to provide for limited oscillating movement of said ring relative to said sleeve, a blocker element carried by said flange and arranged to be selectively disposed in blocking relation to said offset portions of said sleeve tooth in accordance with the lagging or leading relation of the blocker ring relative to the sleeve as permitted by said oscillating movement and adapted to pass between adjacent sleeve teeth to allow said clutching engagement when the blocker element moves from one of said blocking positions to another position of said oscillating movement but not from the other and means for causing engagement of said friction clutch element and portions whereby to facilitate rotation of said blocker ring with said other member so as to maintain said blocking relation when differential rotation exists between said members.

11. In a motor vehicle drive having a rotatable driving structure adapted to receive drive from the engine, and a rotatable driven structure adapted to transmit drive from the driving structure for driving the vehicle, a first set of teeth carried by the driving structure, a second set of teeth carried by the driven structure, a blocker member intermediate said sets of teeth, means on said blocker member extending between adjacent teeth of one of said sets of teeth to provide for limited oscillating movement of said member relative to the said one set of teeth, means mounting one of said sets of teeth for axial shifting movement relative to the other to positively engage said sets of teeth; said blocker member and the said one set of teeth including means providing blocking engagement therebetween when said blocker member is at its limits of oscillating movement, said means comprising an abutment, and first and secondary blocking elements for engaging said abutment upon shift of the shiftable teeth, said first blocking element providing for said blocking engagement during shift of the shiftable teeth when the driving structure rotates at a speed faster than that of the driven structure and said secondary blocking element providing for said blocking engagement during shift of the shiftable teeth when the driving structure speeds up from coast to a speed faster than that of the driven structure; the said first and secondary blocking elements being offset relative to each other in the direction of axial shift of the said one set of teeth such that the said one set of teeth will pass from a condition of blocking engagement between said secondary blocking element and said abutment to one of blocking engagement between said first blocking element and said abutment upon shift of the shiftable teeth when the driving structure passes through synchronism with the driven structure upon speeding up from coast.

12. In a motor vehicle drive having a rotatable driving structure adapted to receive drive from the engine and a rotatable driven structure adapted to transmit drive from the driving structure for driving the vehicle, a first set of teeth carried by one of said structures, said teeth having truncated tooth portions, a second set of teeth carried by the other of said structures, a third set of teeth normally in mesh with said truncated portions of said first set of teeth to drivingly connect said third and first sets of teeth and accommodating limited rotation relatively therebetween, means mounting one of said first and second sets of teeth for shifting movement relative to the other to positively engage the first and second sets of teeth, one of said first and third sets of teeth having axially offset face portions arranged to selectively engage end face portions of the other to block the shiftable teeth against said shifting movement when the first set of teeth rotatably leads or lags the third set of teeth within the limits provided by said driving connection while accommodating said shift of the shiftable teeth during change in the relative rotation between said first and third sets of teeth, the said face portions of said first and third sets of teeth limiting said shift of the shiftable teeth to that change in the relative rotation of the first and third sets of teeth which takes place when the driving structure coasts down to a speed approximately synchronous with the driven structure while preventing said shift of the shiftable teeth during the change in the relative rotation of the first and third sets of teeth which takes place when the driving structure speeds up from coast to a speed faster than that of the driven structure.

13. In a motor vehicle drive having a rotatable driving structure adapted to receive drive from the engine, and a rotatable driven structure adapted to transmit drive from the driving structure for driving the vehicle, a set of teeth carried by one of said structures, a sleeve carried by the other of said structures, a set of teeth carried by said sleeve, said sets of teeth being relatively shiftable into clutching engagement, a rotatable blocker member intermediate said sets of teeth, means on said blocker member and sleeve providing for limited oscillating movement of said member relative to said sleeve, one of said blocker members and sleeve having circumferentially offset face portions arranged to selectively engage abutment means on the other to block the shiftable teeth against said shifting movement when the blocker member rotatably leads or lags the sleeve within the limits of movement provided between said blocker member and sleeve while accommodating said shift of the shiftable teeth during change in the relative rotation between said blocker member and sleeve, one of said offset face portions providing for said blocking engagement during shift of the shiftable teeth when the driving structure rotates at a speed faster than that of the driven structure and a second of said offset faces providing for said blocking engagement during shift of the shiftable teeth when the driving structure speeds up from coast to a speed faster than that of the driven structure; the said offset faces being also axially spaced from each other such that the shiftable teeth will pass from a condition of blocking engagement between the second of said faces and said abutment means to one of blocking engagement between said first of said offset face and said abutment means upon shift of the shiftable teeth when the driving structure passes through synchronism with the driven structure upon speeding up from coast.

14. In a motor vehicle drive having a rotatable driving structure adapted to receive drive from the engine, and a rotatable driven structure adapted to transmit drive from the driving structure for driving the vehicle, a first set of teeth carried by the driving structure, a second set of teeth carried by the driven structure, a blocker member intermediate said sets of teeth, one of said sets of teeth having truncated portions at one end thereof and said blocker member having tooth means extending between adjacent truncated tooth portions of the said one set of teeth to provide for limited oscillating movement of said member relative to the said one set of teeth, means mounting one of said sets of teeth for axial shifting movement relative to the other to positively engage said sets of teeth, a blocking abutment on said blocker member and first and second circumferentially offset blocking faces on the said one set of teeth for engaging said abutment to block the shiftable teeth against said shifting movement when the said one set of teeth rotatably leads or lags said blocker member, said first of said blocking faces being positioned in blocking relation to said abutment when the driving structure is at a speed faster than that of the driven structure, and the said second blocking face being positioned in blocking relation to said abutment when the driving structure speeds up from coast to a speed faster than that of the driven structure, the said first and second blocking faces being also axially spaced apart, said spacing being such that when the driving structure passes through synchronism with the driven structure upon speeding up from coast the said one set of teeth will during shifting movement of the shiftable teeth pass from a condition of blocking engagement between said second blocking face and said abutment to one of blocking engagement between said first blocking face and said abutment.

TENO IAVELLI.
WILLIAM T. DUNN.